United States Patent Office 3,732,314
Patented May 8, 1973

3,732,314
PREPARATION OF AROMATIC ALDEHYDES
Stephen N. Massie, Palatine, Ill., assignor to Universal Oil Products Company, Des Plaines, Ill.
No Drawing. Filed Dec. 7, 1970, Ser. No. 95,947
Int. Cl. C07c 45/02
U.S. Cl. 260—599          7 Claims

ABSTRACT OF THE DISCLOSURE

Aromatic aldehydes are prepared by treating an alkyl substituted aromatic hydrocarbon with an oxygen containing gas in the presence of an alkanol and a catalyst system comprising one or more metal salts.

---

This invention relates to a process for preparing aromatic aldehydes and more particularly with a process for the catalytic oxidation of alkyl substituted aromatic hydrocarbons in the presence of an alkanol and a catalyst system of a type hereinafter set forth in greater detail.

Aromatic aldehydes constitute an important class of chemical compounds, these aldehydes being useful for a variety of purposes. For example, benzaldehyde is useful in organic synthesis, especially for dyes and dye intermediates. In addition, it is also useful as a solvent for oils, resins, some cellulose ethers, cellulose acetate and cellulose nitrate. Other uses for this compound include use in flavoring compounds, in the production of synthetic perfumes, in the manufacture of cinnamic acid, in toilet preparations and soaps, in photographic chemicals, in baking chemicals and in medicine. Inasmuch as benzaldehyde is a partial oxidation product which results from the oxidation of toluene and is itself readily oxidizable to benzoic acid, the process for preparing this intermediate oxidation product from toluene is somewhat difficult to effect. Usually the oxidation of toluene by treatment of said toluene with an oxygen containing gas, and in the presence of a catalyst, will result in said toluene going through a series of oxidation products or stages. For example, the toluene may be first oxidized to benzyl alcohol, the first oxidation step, then to benzaldehyde the second oxidation step and finally to benzoic acid which is the third oxidation step. Inasmuch as benzaldehyde constitutes a more desirable product than benzoic acid, it is necessary to decrease the susceptibility of benzaldehyde to further oxidation which will result in the formation of the aforesaid benzoic acid. It has now been discovered that it is possible to effect the oxidation of an alkyl substituted aromatic hydrocarbon such as toluene to a partial oxidation stage by utilizing an alkanol and certain catalysts of a type hereinafter set forth in greater detail under certain reaction conditions also more specifically set forth in a latter portion of the specification.

The use of alkanol in this process to retard the susceptibility of an alkyl of an aromatic hydrocarbon to complete oxidation is unexpected in view of the prior art which teaches that, when utilizing an alkanol in the oxidation of alkyl substituted aromatic hydrocarbons, the resulting product will comprise an ester of the alkyl substituted aromatic hydrocarbon.

It is therefore an object of this invention to provide a process for the partial oxidation of an alkyl substituted aromatic hydrocarbon.

A further object of this invention is to provide a process for preparing aromatic aldehydes utilizing an alkyl substituted aromatic hydrocarbon as a starting material.

In one aspect an embodiment of this invention resides in a process for the preparation of an aromatic aldehyde which comprises treating an alkyl substituted aromatic hydrocarbon with an insufficient quantity of an oxygen containing gas in the presence of an alkanol and a catalyst comprising one or more metal salts at a temperature in the range of from about 100° C. to about 140° C., and recovering the resultant aromatic aldehyde.

A specific embodiment of this invention resides in a process for the preparation of an aromatic aldehyde which comprises treating toluene with an oxygen containing gas in the presence of methanol and a catalyst system comprising a mixture of ferric bromide and cobalt bromide at a temperature in the range of from about 100° to about 140° C. and recovering the resultant benzaldehyde.

Other objects and embodiments will be found in the following further detailed description of the present invention.

As hereinbefore set forth the present invention is concerned with a process for the preparation of aromatic aldehydes in which an alkyl substituted aromatic hydrocarbon is catalytically oxidized in the presence of an alkanol to form the aforementioned aldedyde, said alkanol contributing to the steady-state concentration of the aldehyde and retarding or blocking the subsequent formation of the further oxidation product, namely, the corresponding aromatic acid. By utilizing reaction conditions of the type hereinafter set forth in greater detail, the yield of the aromatic aldehyde will be greatly increased over that which is obtained when not utilizing this certain set of conditions which contribute to the present invention.

Examples of alkyl substituted aromatic hydrocarbons which may be converted to the corresponding aldehydes will include toluene, ethylbenzene, n-propylbenzene, n-butylbenzene, n-amylbenzene, 1-methylnaphthalene, 2-methylnaphthalene, 1-ethylnaphthalene, 2-ethylnaphthalene, 1-n-propylnaphthalene, 2-n-propylnaphthalene, etc., o-xylene, m-xylene, p-xylene, o-diethylbenzene, m-diethylbenzene, p-diethylbenzene, o-dipropylbenzene, m-dipropylbenzene, p-dipropylbenzene, mesitylene, pseudocumene, hemimellitene, durene, isodurene, prehnitene, pentamethylbenzene, hexamethylbenzene, etc. It is to be understood that the aforementioned alkyl substituted aromatic hydrocarbons are only representative of the class of compounds which may be utilized as the starting material, and that the present invention is not necessarily limited thereto.

The alkyl substituted aromatic hydrocarbon is subjected to a catalytic oxidation reaction by treatment with an insufficient amount of an oxygen containing gas in the presence of an alkanol and a catalyst system comprising one or more metal salts.

Of the alkanols which are utilized, methyl alcohol is the preferred species, although it is also contemplated that other lower alkyl alcohols such as ethyl alcohol, n-propyl alcohol, isopropyl alcohol, n-butyl alcohol, etc., may also be used. The catalyst system which is employed to effect the process of the present invention will, as hereinbefore set forth, comprise one or more metallic salt compounds, one of said metal salts preferably comprising an iron containing compound such as ferric bromide or ferric chloride. The other metal salt portion of the catalyst may comprise a transition series metal halide such as cobalt bromide, cobalt chloride, manganese bromide, manganese chloride, nickel chloride, nickel bromide, or the salt of iron, cobalt, maganese or nickel with an organic carboxylic acid such as acetic acid, propionic acid, octanoic acid, 2-ethylhexanoic acid, cyclohexanoic acid, etc.

Oxidation reaction conditions under which the process of the present invention is effected will include elevated temperatures, preferably in a range of from about 100° to about 140° C. and a pressure ranging from atmospheric up to about 1,000 pounds per square inch or more. The alkyl substituted aromatic hydrocarbon which is undergoing oxidation to the corresponding aldehyde form is present in a mol excess over the amount of oxygen which is utilized to effect said oxidation reaction, being present in the reactor in a mol ratio in the range of from about 2:1 to about 10:1 mols of alkyl substituted aromatic hydrocarbon per mol of oxygen in the oxygen containing gas. The latter may consist primarily of air or oxygen, the former being utilized due to the greater availability and lower cost.

The process of this invention may be effected in any suitable manner and may comprise either a batch or continuous type operation. For example, when a batch type operation is used, a quantity of the alkyl substituted aromatic hydrocarbon is placed in an appropriate apparatus which may comprise an autoclave of the mixing or rotating type. In addition, the autoclave will also contain an alkanol such as methyl alcohol and a catalytic amount of the catalyst system comprising a transition metal salt or mixtures thereof. The autoclave is then sealed, pressured with an oxygen containing gas to the initial operating pressure and thereafter heated to the desired temperature. The reaction is then allowed to proceed at this reaction temperature for a predetermined period of time which may range from about 0.5 up to about 20 hours or more in duration. It is also contemplated within the scope of this invention that operating temperatures in excess of 140° C. may be employed if the reaction is effected in correspondingly shorter residence time. At the end of this time, heating is discontinued, the autoclave is allowed to return to room temperature and the excess pressure is discharged. The autoclave is then opened and a reaction product is recovered. After separation from the catalyst, the liquid mixture is then subjected to conventional means of purification and separation including washing, drying, extraction, fractional distillation, etc., whereby the desired product comprising the aromatic aldehyde is separated from any unreacted starting material, side reaction product which may have formed and alkanol.

It is also contemplated within the scope of this invention that the reaction may be effected in a continuous manner of operation. When such an operation is used, the alkyl aromatic hydrocarbon which is to undergo catalytic oxidation is continuously charged to the reaction zone which is maintained at the proper operating conditions of temperature and pressure. In addition, the apparatus will also contain the catalyst. The alkanol may be charged to the reactor through a separate line, if so desired, may be admixed to the reaction product and the resulting product will be charged thereto in a single stream. In addition, the oxygen containing gas is also continuously charged to the reaction zone through a separate line, said oxygen containing gas being present in a mol ratio of from about 1:2 to about 1:10 mols of an oxygen containing gas per mol of alkyl aromatic hydrocarbon. Upon completion of the desired residence time, the reactor effluent is continuously withdrawn and subjected to conventional means of separation whereby the desired aromatic aldehyde is separated and recovered whereby the unreacted alkyl aromatic hydrocarbon is recycled to form a portion of the feed stock.

Examples of aromatic aldehydes which may be prepared according to the process of this invention will include benzaldehyde, o-tolualdehyde, m-tolualdehyde, p-tolualdehyde, 3,5 - dimethylbenzaldehyde, pentamethylbenzaldehyde, 4-ethylbenzaldehyde, etc.

The following examples are given to illustrate the process of the present invention which, however, are not intended to limit the generally broad scope of the present invention in strict accordance therewith.

EXAMPLE I

To illustrate the necessity for the presence of an alkanol in the reaction mixture, an experiment was performed in which 60 g. of toluene and 4 g. of nickel bromide were charged to the glass liner of a rotating autoclave. The autoclave was sealed and 35 atmospheres of air was pressured in. The autoclave was then heated to a temperature of 180° C. for a period of 16 hours, the maximum pressure at this temperature rising to 63 atmospheres. At the end of this time, the heating was discontinued and the autoclave allowed to return to room temperature, the final pressure at room temperature being 27 atmospheres. The excess pressure was discharged, the autoclave was opened and the reaction mixture was recovered. Analysis of the product disclosed the presence of 65 mmols of benzaldehyde per mol of oxygen charged to the reactor, the predominant product being the less desirable benzoic acid.

EXAMPLE II

The following experiment was performed in which an additive, namely, methyl alcohol was present in the reaction zone, the results illustrating the increased yield of the desired product which is obtained thereby. In this example, 650 mmols of toluene along with 2 g. of a catalyst comprising a ferric bromide-cobalt bromide mixture and 40 g. of methanol were placed in the glass liner of a rotating autoclave. The autoclave was sealed and 280 mmols of oxygen as air was charged thereo. The autoclave was then heated to a temperature of 140° C. and maintained thereat for a period of 16 hours. At the end of this time, heating was discontinued and the autoclave allowed to return to room temperature. The excess pressure was discharged, the autoclave was separated and the reaction product was recovered. Analysis of this product disclosed the presence of 268 mmols of benzaldehyde per mol of oxygen charged, there being a 95% consumption of oxygen.

A repeat of this experiment utilizing similar charges of materials except for 1.0 g. of ferric bromide as catalyst with a reaction temperature of 140° C. for a period of 8 hours resulted in the obtention of 230 mmols of benzaldehyde per mol of oxygen charged. Similar increases in benzaldehyde production in the presence of alkanol were noted with manganese bromide and cobalt bromide alone or in mixtures with each other or with the metal salts disclosed above. Therefore it is readily apparent that by utilizing a catalyst consisting of one or more metal halides, the presence of an alkanol such as methyl alcohol and employing reaction temperatures of from 120° to 140° C., in the presence of insufficient air, it is possible to obtain an unexpectedly greater yield of a partial oxidation product of an alkyl substituted aromatic hydrocarbon, namely, benzaldehyde from toluene, than was obtained when utilizing the same catalyst, in the absence of an alkanol and a higher reaction temperature.

EXAMPLE III

In this example 40 g. of p-xylene are placed in the glass liner of a rotating autoclave along with 40 g. of methanol and 2 g. of a catalyst comprising ferric bromide. The autoclave is sealed and air pressed in until an initial pressure of 25 atmospheres is reached. The autoclave is then heated to a temperature of 120° C. and maintained thereat for a period of 16 hours. At the end of this time, heating is discontinued, the autoclave is allowed to return to room temperature, the excess pressure is discharged and the reaction mixture is recovered from the autoclave. Analysis of this product will disclose the presence of a major portion of p-tolualdehyde.

EXAMPLE IV

A reaction mixture consisting of 800 mmols of ethylbenzene, 2 g. of a catalyst comprising cobalt bromide and 40 g. of methanol is charged to the glass liner of a rotating autoclave. The autoclave is sealed and 300 mmols of oxygen is charged thereto. The autoclave is then heated to a temperature of 140° C. and maintained at this temperature for a period of 16 hours. At the end of this time period, heating is discontinued and the apparatus is allowed to return to room temperature. Following this the excess pressure is discharged and the reaction mixture is recovered from the autoclave. Analysis of this mixture will disclose the presence of a major portion of benzaldehyde.

EXAMPLE V

In a manner similar to that hereinbefore set forth in the above examples, a mixture of 700 mmols of mesitylene, 2 g. of a catalyst system comprising manganese bromide and 50 g. of methanol is placed in the glass liner of an autoclave which is thereafter sealed. Following this, 300 mmols of oxygen as air is charged to the autoclave which is then heated to a temperature of 140° C. After maintaining the apparatus at this temperature for a period of 16 hours, heating is discontinued and the autoclave is allowed to return to room temperature. The excess pressure is discharged, the autoclave is opened and the reaction mixture is recovered therefrom. Analysis of the reaction mixture will disclose the presence of a major portion of 3,5-dimethylbenzaldehyde.

I claim as my invention:

1. A process for the preparation of an aromatic aldehyde which comprises reacting an alkyl substituted aromatic-hydrocarbon with oxygen in a mol ratio of from about 2:1 to 10:1 mols of hydrocarbon per mol of oxygen in the presence of an alkanol and a metal salt catalyst selected from the group consisting of ferric, cobalt, manganese and nickel, halide and carboxylic acid salts, at a temperature of from about 100° C. to about 140° C., a pressure of from atmospheric to about 1000 pounds per square inch and for a time period of from 0.5 to about 20 hours, and recovering the resultant aromatic aldehyde.

2. The process as set forth in claim 1 in which said catalyst comprises a mixture of ferric bromide and cobalt bromide.

3. The process as set forth in claim 1 in which said catalyst comprises one or more transition metal compounds selected from the group consisting of cobalt bromide, ferric bromide, nickel bromide and manganese bromide.

4. The process as set forth in claim 1 in which said alkyl substituted aromatic hydrocarbon is toluene and said aromatic aldehyde is benzaldehyde.

5. The process as set forth in claim 1 in which said alkyl substituted aromatic hydrocarbon is p-xylene and said aromatic aldehyde is p-tolualdehyde.

6. The process as set forth in claim 1 in which said alkyl substituted aromatic hydrocarbon is m-xylene and said aromatic aldehyde is m-tolualdehyde.

7. The process as set forth in claim 1 in which said alkyl substituted aromatic hydrocarbon is mesitylene and said aromatic aldehyde is 3,5-dimethylbenzaldehyde.

References Cited

UNITED STATES PATENTS

| | | | |
|---|---|---|---|
| 2,879,289 | 3/1959 | Johnson | 260—476 R X |
| 3,547,982 | 12/1970 | McKeon et al. | 260—476 R X |
| 2,198,946 | 4/1940 | Moskovitz | 260—476 R |
| 3,387,036 | 6/1968 | Bonnart et al. | 260—599 |

BERNARD HELFIN, Primary Examiner

U.S. Cl. X.R.

260—524 R